(12) United States Patent
Venable

(10) Patent No.: US 6,182,363 B1
(45) Date of Patent: Feb. 6, 2001

(54) METHOD OF MAKING A POPPET VALVE

(75) Inventor: Frederick D. Venable, Lafayette, IN (US)

(73) Assignee: TRW Inc., Lyndhrust, OH (US)

( * ) Notice: Under 35 U.S.C. 154(b), the term of this patent shall be extended for 0 days.

(21) Appl. No.: 09/414,265

(22) Filed: Oct. 7, 1999

(51) Int. Cl.[7] .................................................. B21K 1/22
(52) U.S. Cl. ........................................ 29/888.4; 29/446
(58) Field of Search ................................ 29/446, 888.46, 29/520

(56) References Cited

U.S. PATENT DOCUMENTS

| | | |
|---|---|---|
| 2,456,651 | 12/1948 | Schmiel . |
| 4,217,927 | * 8/1980 | Morita . |
| 4,286,620 | 9/1981 | Turney . |
| 4,295,412 | 10/1981 | Hachiro . |
| 4,433,615 | * 2/1984 | Vick . |
| 4,512,278 | * 4/1985 | Winther . |
| 4,549,572 | * 10/1985 | Wright . |
| 4,766,924 | * 8/1988 | Lee . |
| 4,768,605 | 9/1988 | Miller et al. . |
| 5,257,537 | 11/1993 | Bianchi . |
| 5,378,118 | 1/1995 | Phillips . |
| 5,496,155 | 3/1996 | Noah et al. . |
| 5,704,391 | 1/1998 | McGowan, Jr. et al. . |

* cited by examiner

*Primary Examiner*—S. Thomas Hughes
*Assistant Examiner*—Anthony L. Green
(74) *Attorney, Agent, or Firm*—Tarolli, Sundheim, Covell, Tummino & Szabo L.L.P.

(57) ABSTRACT

A method of making a valve (62) that has a poppet valve member (100) biased by a spring (110) toward a closed position against a poppet valve seat (90). The spring acts between the poppet valve member and a spring seat (120) and applies a predetermined force to the poppet valve member. The method comprises the steps of providing a valve housing (70) having a chamber (72); inserting into the chamber in sequential order the poppet valve seat (90), the poppet valve member (100), the spring (110), and the spring seat (120); applying a force to the spring seat to compress the spring a predetermined amount; and securing the poppet valve seat and the spring seat to the housing (70) while maintaining the spring compressed the predetermined amount.

9 Claims, 2 Drawing Sheets

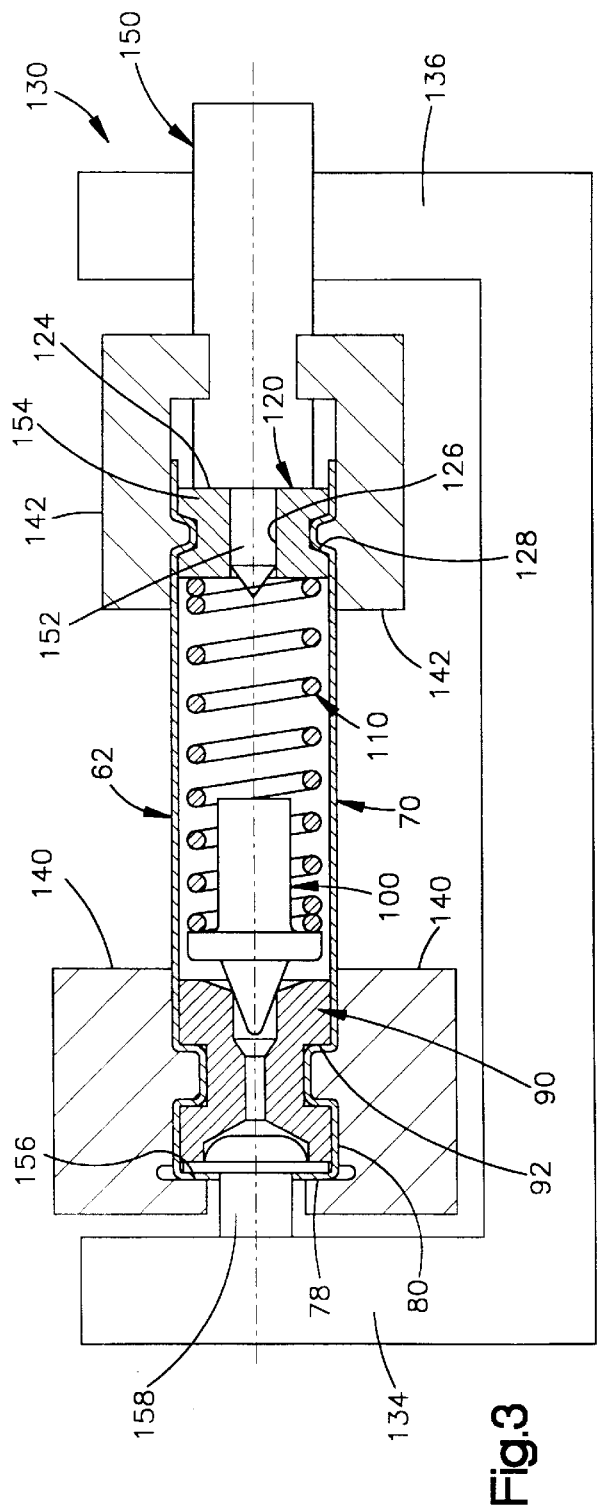
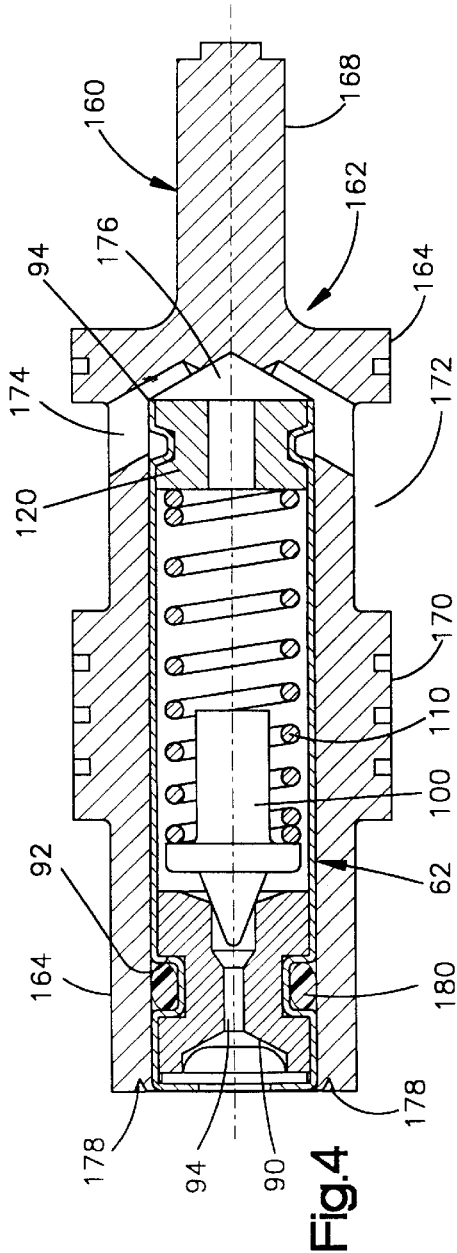

METHOD OF MAKING A POPPET VALVE

BACKGROUND OF THE INVENTION

1. Technical Field

The present invention relates to a poppet valve for controlling pressure in a fluid power assist steering system. In particular, the present invention relates to a method of making such a poppet valve.

2. Description of the Prior Art

A known fluid power assist steering system includes a pump for pumping hydraulic fluid under pressure to a fluid power assist steering gear. The output pressure demands on the pump can vary with the pump flow and system load restriction. This pressure must be limited to a predetermined maximum in order to protect the pump and other system components from damage. To this end, the pump contains a relief valve assembly.

The relief valve assembly includes a movable spring biased spool that contains an internal poppet valve assembly. The spool normally covers a fluid exhaust port. The spool is exposed to the output pressure of the pump. Output pressure is also communicated through an orifice to the opposite side of the spool, which contains a venting passage normally blocked by the poppet valve assembly. When the output pressure of the pump exceeds the predetermined maximum amount, the poppet valve assembly opens to exhaust fluid through the vent passage. The reduced pressure on this side of the spool allows the spool to move, opening the exhaust port, and thereby relieving the output pressure.

The prior art poppet valve assembly includes a poppet spring that biases a poppet against a poppet seat. The force applied by the poppet spring determines the pressure at which the poppet valve assembly opens. This force is determined by assembling the poppet valve assembly using shims to set the initial position of the poppet valve seat and, thus, the force applied by the poppet valve spring. Determining the correct number of shims to use in a particular poppet valve assembly is a time-consuming and labor-intensive process.

SUMMARY OF THE INVENTION

The present invention is a method of making a valve having a poppet valve member that is biased by a spring toward a closed position against a poppet valve seat, the spring acting between the poppet valve member and a spring seat and applying a predetermined force to the poppet valve member. The method comprises the steps of providing a valve housing having a chamber; inserting into the chamber in sequential order the poppet valve seat, the poppet valve member, the spring, and the spring seat; applying a force to the spring seat to compress the spring a predetermined amount; and securing the poppet valve seat and the spring seat to the housing while maintaining the spring compressed the predetermined amount.

BRIEF DESCRIPTION OF THE DRAWINGS

Further features of the present invention will become apparent to those skilled in the art to which the present invention relates from reading the following specification with reference to the accompanying drawings, in which:

FIG. 3 is a illustration of the poppet valve assembly of FIG. 2 shown in an assembled condition; and FIG. 4 is a illustration similar to FIG. 1 of a relief valve including the poppet valve assembly of FIG. 3 as manufactured in accordance with the present invention.

DESCRIPTION OF A PREFERRED EMBODIMENT

Figure 1:
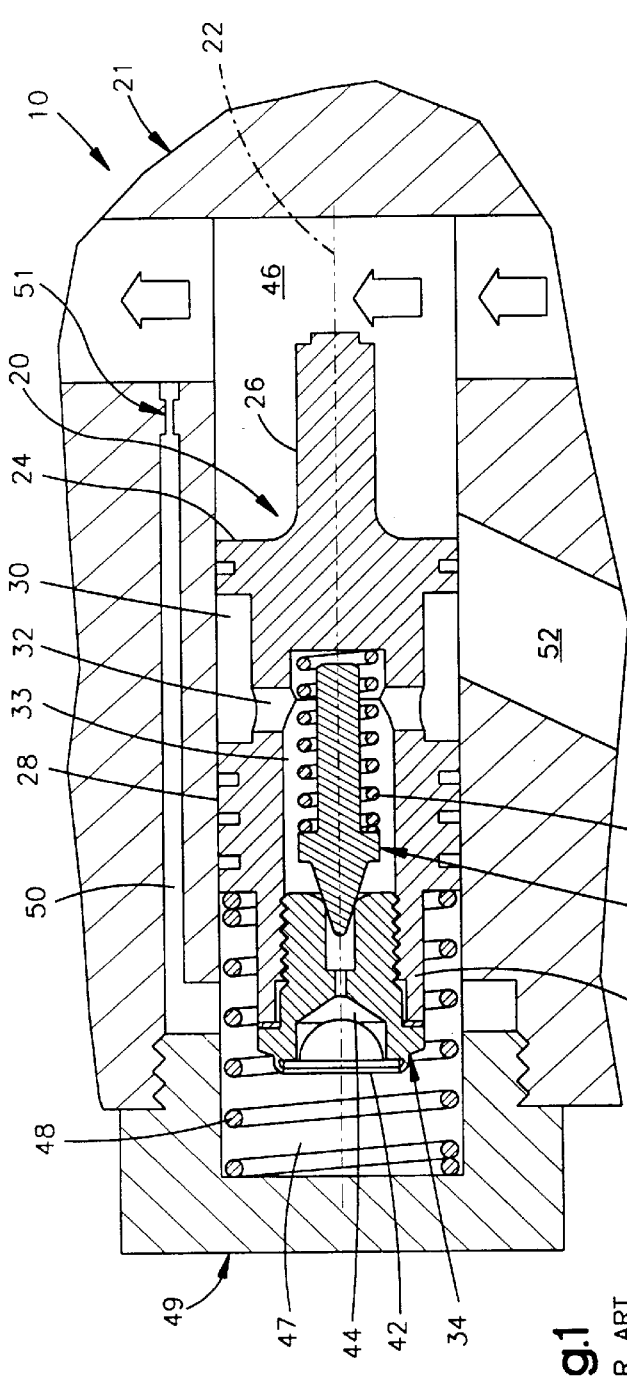
FIG. 1 is a schematic illustration of a prior art relief valve including a poppet valve assembly manufactured in accordance with a prior art manufacturing method.

FIG. 1 is a schematic illustration of a prior art relief valve 10 including a poppet valve assembly 12 manufactured in accordance with a prior art manufacturing method. The relief valve 10 is included in a pump 11 (the other parts of which are not shown) for a hydraulic fluid power assist steering system.

The relief valve 10 includes a spool 20 movable in a housing 21 along an axis 22. Near a first end portion of the spool 20 is a first land 24. A narrow diameter rod portion 26 of the spool 20 projects from the land 24. A second land 28 is located centrally on the spool 20. Between the lands 26 and 28 is a groove 30. One or more fluid passages 32 extend inward from the groove 30 to a central cavity 33 in the spool 20.

A poppet seat 34 is screwed into a second end portion 36 of the spool 20. A poppet 38 is disposed in the central cavity in the spool 20. The poppet 38 is biased into engagement with the poppet seat 34 by a poppet spring 40. A wire screen 42 covers an opening 44 in the poppet seat 34 that communicates fluid pressure to the poppet seat.

The rod portion 26 of the spool 20 is located in a passage 46 in the pump that is exposed to the output pressure of the pump. This output pressure acts on the spool 20 to hold the spool in position against the biasing force of a spring 48. The spring 48 acts between the spool 20 and a seat 49. The first land 24 on the spool 20 is disposed between the passage 46 and a recirculation passage 52. This output pressure is also communicated through a conduit 50 containing a flow restricting orifice 51 to a spool spring cavity 47 and then to the opening 44 in the poppet seat 34.

Should the output pressure of the pump exceed a predetermined pressure, this increased pressure is communicated through the conduit 50 and orifice 51 to the spool spring cavity 47 and then to the opening 44 in the poppet seat 34. The fluid pressure acts against the poppet 38. The poppet 38 moves off the poppet seat 34, against the biasing force of the poppet spring 40. Fluid flows through the spool 20 and out the exhaust passages 32 to the recirculation passage 52 and thereby to the pump inlet, thus reducing pressure in the spool spring cavity 77, allowing the spool 24 to move against the spring 48 and thereby opening the exhaust port 52. The output pressure is thus reduced to the desired predetermined pressure.

The prior art relief valve 10 is assembled by first inserting the poppet spring 40 and the poppet 38 into the central cavity in the spool 20. The poppet seat 34 is then screwed into the spool 20 until it engages the poppet 38. Further movement of the poppet seat 34 into the spool 20 compresses the poppet spring 40. The amount of compression of the poppet spring 40 determines how much fluid pressure is needed to open the poppet valve assembly 12.

The amount of compression of the poppet spring 40 is set by how far the poppet seat 34 is screwed into the spool 20. How far the poppet seat 34 is screwed into the spool 20 is determined by the placement of one or more shims 54 between the spool and the poppet seat during assembly of the relief valve 10. Depending on the parts tolerances and the compressive force of the particular poppet spring 40, different numbers of shims 54 may be needed for different poppet valve assemblies 12. The appropriate number of shims 54 for each particular poppet valve assembly 12 must be determined on an ad hoc, or piece by piece, basis.

Figure 2:
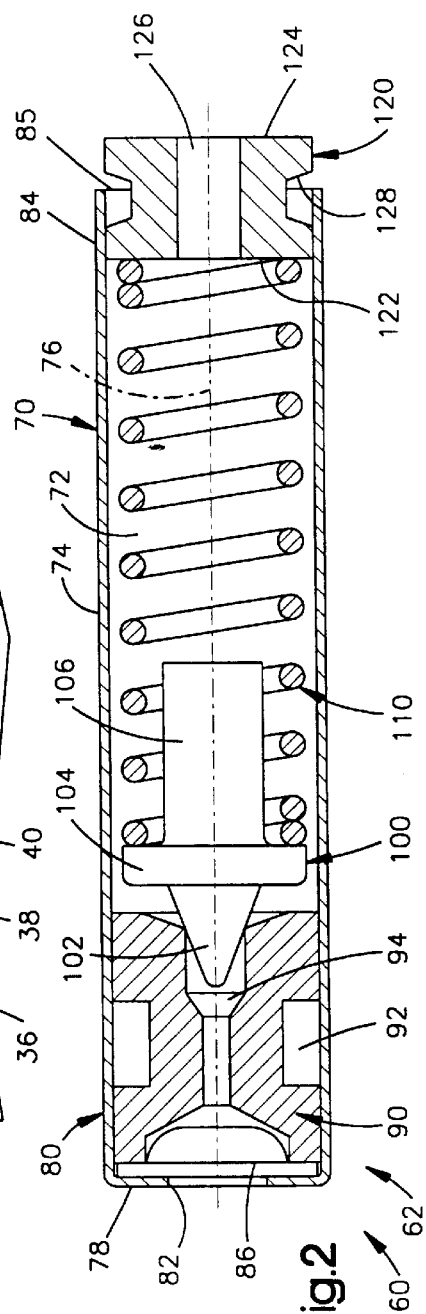
FIG. 2 is a schematic illustration of portions of a relief valve manufactured in accordance with the present invention, including a poppet valve assembly shown in a partially assembled condition.

In accordance with the present invention, a relief valve 60 (FIG. 4) includes a poppet valve assembly 62 assembled in a manner as shown in FIGS. 2 and 3. The poppet valve assembly includes a housing 70.

The housing 70 is made from deep drawn thin wall tubing preferably made from steel. The housing 70 has a generally cylindrical configuration defining a chamber 72 in the housing. The housing 70 includes a cylindrical side wall 74 extending parallel to a longitudinal central axis 76 of the housing. A radially extending end wall 78 of the housing 70 caps a first end portion 80 of the housing. A circular opening 82 in the end wall 78 is centered on the axis 76. An opposite second end portion 84 of the housing 70 defines a second opening 85 into the housing.

A wire screen 86 is disposed in the first end portion 80 of the housing 70, in abutting engagement with the end wall 78 of the housing. A poppet valve seat 90 is disposed in the housing 70 in abutting engagement with the wire screen 86. The poppet seat 90 has an outer peripheral groove 92 extending circumferentially inside the side wall 74 of the housing 70. A central passage 94 extends axially through the poppet seat 90.

A poppet 100 is disposed in the housing 70. The poppet 100 has a nose 102 in abutting engagement with the poppet seat 90. The poppet 100 has a spring flange 104 and a cylindrical end portion 106 opposite the nose 102.

A poppet spring 110 is disposed in the housing 70 in abutting engagement with the spring flange 104 of the poppet 100. The poppet spring 110 extends along the remaining length of the housing 70.

A spring seat or spring stop 120 is disposed in, and projects partially from, the second end portion 94 of the housing 70. The spring stop 120 has radially extending inner and outer end faces 122 and 124. The inner end face 122 of the spring stop 120 is in abutting engagement with the poppet spring 110. The spring stop 120 has a cylindrical central passage 126 extending axially through the spring stop between the end faces 122 and 124. The spring stop 120 also has an annular groove 128 on its outer periphery, similar to the groove 92 on the poppet seat 90.

The poppet valve assembly 62 is put into the partially assembled condition shown in FIG. 2 by inserting into the chamber 72 in the housing 70, in sequential order, the wire screen 86, the poppet seat 90, the poppet 100, the poppet spring 110, and the spring stop 120. In this partially assembled condition, the poppet spring 110 is not compressed.

The partially assembled poppet valve assembly 62 is then placed in a groove rolling fixture shown schematically at 130 (FIG. 3). The fixture 130 has a base 132 and a pair of upstanding arms 134 and 136 at opposite ends of the base. The fixture 130 supports a first pair of groove rolling racks 140 and a second pair of groove rolling racks 142. An axially movable plunger 150 is supported in the arm 136 for sliding movement in a direction parallel to the axis 76.

A narrow end portion 152 of the plunger 150 projects into the central passage 126 in the spring stop 120. A radially extending end face 154 of the plunger 150 is in abutting engagement with the outer end face 124 of the spring stop 120. At the opposite end of the poppet valve assembly 62 (the left end as viewed in FIG. 3), the end wall 78 of the housing 70 is in abutting engagement with an inner end surface 156 on the first pair of groove rolling racks 140. As a result, the poppet valve assembly 12 is held in position axially in the fixture 130.

A pin 158 on the arm 134 of the fixture 130 supports one end of the poppet valve assembly 62; the plunger 150 supports the other end. The first pair of rolling racks 140 extends around the poppet valve seat 90. The second pair of rolling racks 142 extend around the spring stop 120.

After the poppet valve assembly 62 is placed in the fixture 130, but before the rolling racks 140 and 142 are actuated, the plunger 150 is moved axially to compress the poppet spring 110. The poppet spring 110 is compressed to the desired, predetermined amount of force. When this force level is reached, the poppet valve assembly 12 is in the desired condition for relief of fluid pressure in the relief valve assembly 10.

While maintaining the poppet spring 110 compressed the predetermined amount, the rolling racks 140 and 142 are actuated. When the rolling racks 140 and 142 are actuated, the first pair of rolling racks 140 rolls or crimps the material of the first end portion 80 of the housing 70 into the groove 92 on the poppet valve seat 90. This fixes the poppet valve seat 90 axially in the housing 70. The second pair of rolling racks 142 rolls or crimps the material of the second end portion 84 of the housing 70 into the groove 128 on the spring stop 120. This fixes the spring stop 120 axially in the housing 70.

The poppet valve assembly 62 is then removed from the fixture 130 and mounted in a spool 160 as shown in FIG. 4. The spool 160 has opposite first and second end portions 162 and 164. Near the first end portion 162 of the spool 160 is a first land 166. A narrow diameter rod portion 168 of the spool 160 projects from the first land 166. A second land 170 is located centrally on the spool 160.

Between the lands 166 and 170 is a groove 172. One or more fluid passages 174 extend radially inward and axially from the groove 172 to a location radially inward of the first land 166. The passages 174 communicate with a cylindrical central cavity 176 of the spool 160. The opposite second end portion 164 of the spool 160 opens into the central cavity 176.

The poppet valve assembly 62 is placed in the central cavity 176 of the spool 160. The second end portion 94 of the housing 70 engages the first end portion 162 of the spool 160. The second end portion 164 of the spool 160 is staked at several locations 178 to secure the poppet valve assembly 62 in the spool 160. An O-ring 180 in the groove 92 in the poppet valve seat 90 seals between the housing 70 and the spool 160.

The resulting relief valve assembly 60 of the present invention functions in substantially the same manner as the prior art relief valve assembly 10 (FIG. 1). Pump output pressure acts on the spool 160 to hold the spool in position against the biasing force of a spring (not shown). Should the output pressure of the pump exceed a predetermined amount, this increased pressure is communicated through the central passage 94 in the poppet seat 90 and acts against the poppet 100. The poppet 100 moves off the poppet seat 90, against the biasing force of the poppet spring 110. Fluid flows through the central cavity 176 of the spool 160 and out of the fluid passages 174 to the pump inlet, thus reducing the pressure on the spring biased side of the spool, allowing it to move against the spring and thereby opening the exhaust port. The output pressure is thus reduced to the desired predetermined pressure.

From the above description of the invention, those skilled in the art will perceive improvements, changes and modifications in the invention. Such improvements, changes and modifications within the skill of the art are intended to be covered by the appended claims.

Having described the invention, I claim:

1. A method of making a valve having a poppet valve member that is biased by a spring toward a closed position against a poppet valve seat, the spring acting between the poppet valve member and a spring seat and applying a predetermined force to said poppet valve member, said method comprising the steps of:

providing a valve housing having a chamber;

inserting into said chamber in sequential order said poppet valve seat, said poppet valve member, said spring, and said spring seat;

applying a force to said spring seat to compress said spring a predetermined amount; and fixedly securing said poppet valve seat and said spring seat to said housing while maintaining said spring compressed the predetermined amount.

2. A method as set forth in claim 1 wherein said step of fixedly securing said poppet seat and said valve seat to said housing includes the steps of:

deforming a first part of said valve housing into locking engagement with said poppet valve seat to secure said valve housing and poppet valve seat together while maintaining said spring compressed the predetermined amount; and deforming a second part of said valve housing into locking engagement with said spring seat to fixedly secure said valve housing and spring seat together while maintaining said spring compressed the predetermined amount.

3. A method as set forth in claim 2 wherein said deforming steps include rolling parts of said valve housing into outer peripheral grooves on said poppet valve seat and said spring seat.

4. A method as set forth in claim 1 further comprising the step of providing a spool having a central cavity and fixedly mounting said valve housing in said central cavity in said spool.

5. A method as set forth in claim 4 wherein said step of fixedly mounting said valve in said central cavity in said spool includes staking portions of said spool to secure said valve to said spool.

6. A method of making a valve comprising the steps of:

providing a tubular housing having an end wall at one end of said tubular housing, said end wall having a first opening therethrough;

inserting a poppet valve seat into said tubular housing through a second opening in said tubular housing at a second end of said tubular housing opposite said one end;

inserting a poppet valve into said tubular housing into engagement with said poppet valve seat;

inserting into said tubular housing a spring for biasing said poppet valve against said poppet valve seat, inserting into said tubular housing a spring seat against which said spring acts;

compressing said spring a predetermined amount;

deforming a first part of said tubular housing into locking engagement with said poppet valve seat to fixedly secure said tubular housing and poppet valve seat together while maintaining said spring compressed the predetermined amount; and deforming a second part of said tubular housing into locking engagement with said spring seat to fixedly secure said tubular housing and spring seat together while maintaining said spring compressed the predetermined amount.

7. A method as set forth in claim 6 wherein said step of deforming a first part of said tubular housing into locking engagement with said poppet valve seat includes crimping said first part of said tubular housing into an outer peripheral groove on said poppet valve seat, and wherein said step of deforming a second part of said tubular housing into locking engagement with said spring seat includes crimping said second part of said tubular housing into an outer peripheral groove on said spring seat.

8. A method as set forth in claim 7 wherein said step of crimping said first part of said tubular housing includes rolling said first part of said tubular housing, and said step of crimping said second part of said tubular housing includes rolling said second part of said tubular housing.

9. A method as set forth in claim 6 further comprising the steps of providing a spool having a central cavity, inserting said valve housing in said central cavity in said spool, and staking portions of said spool to secure said valve housing to said spool.

* * * * *